United States Patent [19]

Ditzig

[11] Patent Number: 4,717,021
[45] Date of Patent: Jan. 5, 1988

[54] VIDEO CASSETTE CONTAINER DISPLAY

[76] Inventor: Albert Ditzig, 1155 Mayfield, Hoffman Estates, Ill. 60195

[21] Appl. No.: 896,108

[22] Filed: Aug. 13, 1986

[51] Int. Cl.⁴ .................. B65D 85/67; B65D 73/00
[52] U.S. Cl. .................... 206/387; 206/444; 206/459; 206/472
[58] Field of Search ............ 206/387, 444, 457, 450, 206/455, 472, 459; 283/64; 281/31, 34

[56] References Cited

U.S. PATENT DOCUMENTS

| | | | |
|---|---|---|---|
| 1,528,087 | 3/1925 | Sheridan et al. | 281/34 |
| 1,696,629 | 12/1928 | Fenno | 281/31 |
| 3,572,767 | 3/1971 | Learned et al. | 281/34 |
| 3,915,778 | 10/1975 | Carter et al. | 281/31 |
| 4,128,262 | 12/1978 | Du Corday | 281/34 |
| 4,314,635 | 2/1982 | Fraser et al. | 206/232 |
| 4,407,410 | 10/1983 | Graetz et al. | 206/472 |
| 4,519,500 | 5/1985 | Perchak | 206/444 |
| 4,605,245 | 8/1986 | Wearer | 281/34 |
| 4,629,349 | 12/1986 | Pitts | 281/31 |
| 4,635,797 | 1/1983 | Barkier | 206/472 |

FOREIGN PATENT DOCUMENTS

| | | | |
|---|---|---|---|
| 3527569 | 2/1986 | Fed. Rep. of Germany | 206/387 |
| 2518297 | 6/1983 | France | 206/387 |
| 2091692 | 4/1982 | United Kingdom | 206/472 |

Primary Examiner—Stephen Marcus
Assistant Examiner—Brenda J. Ehrhardt
Attorney, Agent, or Firm—Jeffrey M. Morris

[57] ABSTRACT

A specially arranged, display jacket and protective casing is attached to a video cassette storage case to provide transparent pockets for holding identification labels and promotional material to identify, advertise, and promote the movie or program recorded on the video tape cassette housed in the storage case and to identify, advertise, and promote the products and services of others.

11 Claims, 9 Drawing Figures

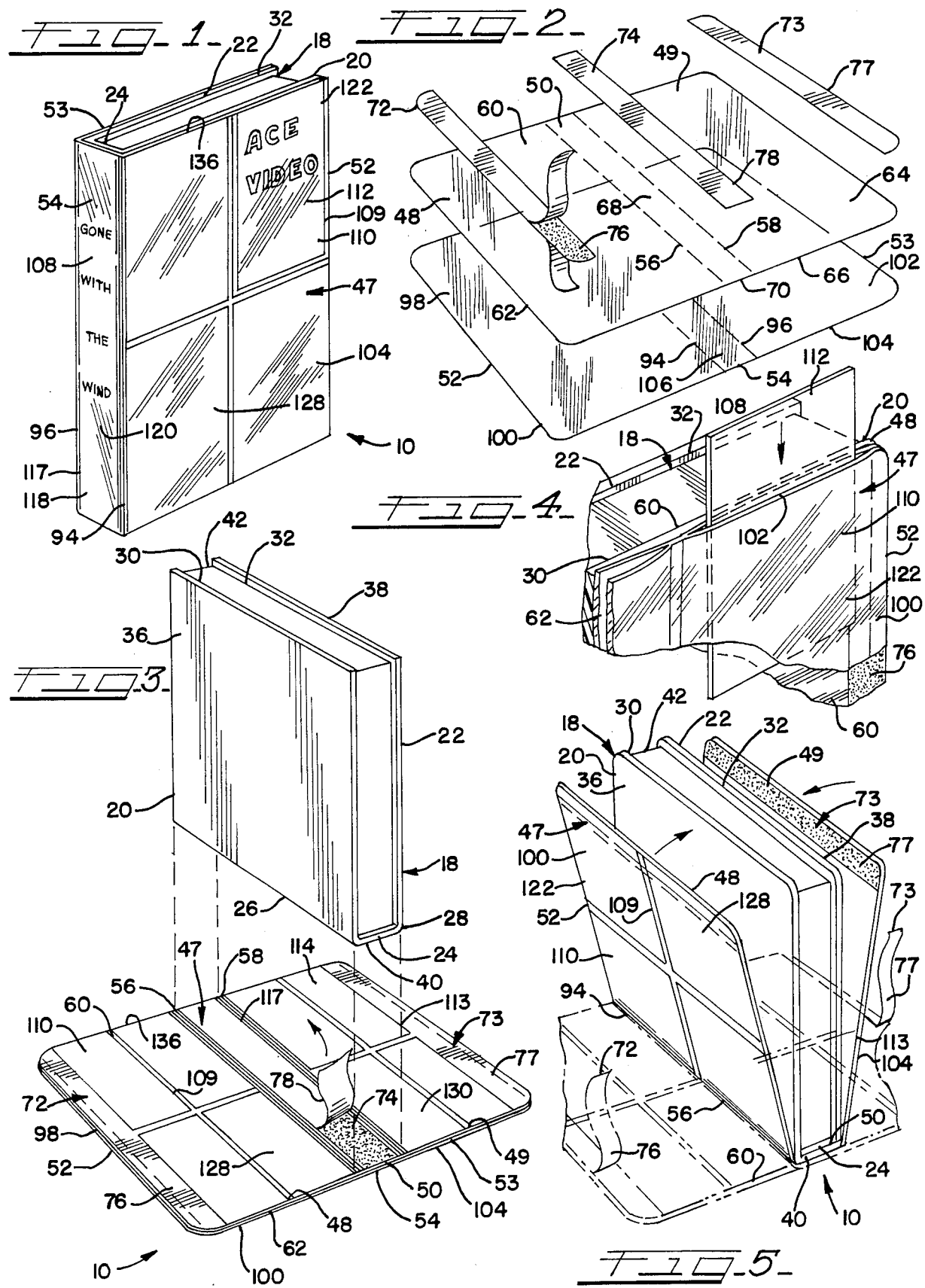

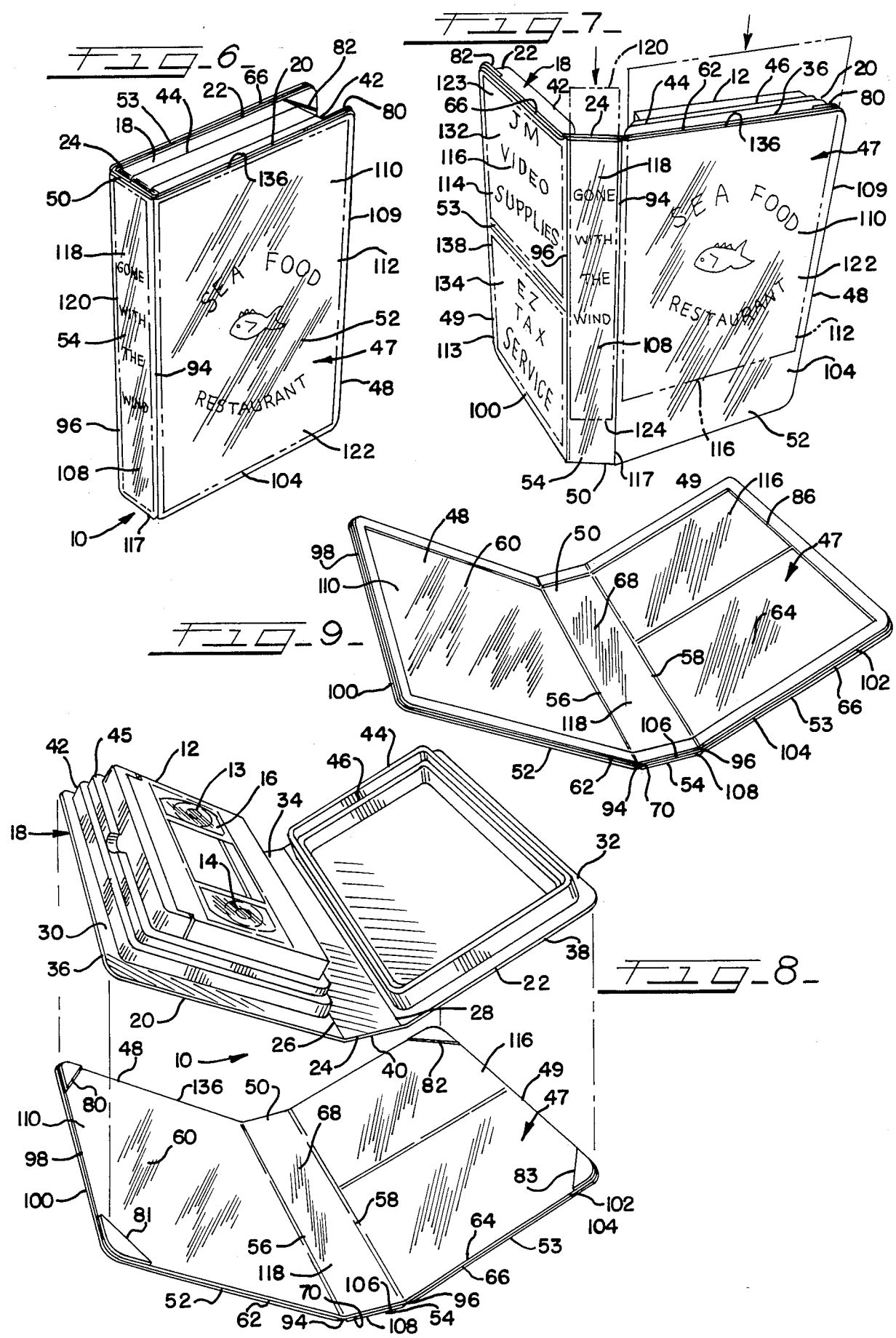

VIDEO CASSETTE CONTAINER DISPLAY

BACKGROUND OF THE INVENTION

This invention pertains to video tape cassette containers, and more particularly, to a promotional display and container assembly for storing, identifying, and advertising a video tape cassette and/or the products or services of others.

Video tape cassettes are available in various formats and sizes, such as Beta video tape cassettes, VHS video tape cassettes, 8 mm video tape cassettes, commercial size video tape cassette, European style video tape cassettes, etc. These cassettes are usually stored in boxes, or plastic containers, such book-like black plastic containers. Such containers can be readily stacked on shelves or stored in drawers.

While these containers are in uniform sizes and easy to store, they are not usually labeled and obscure, hide and block the contents (the particular video) in the video cassette containers. This causes much confusion and invariable requires the user or owner to open each container and read the label, if any, on the video tape cassette. With two or more cassette containers, the procedure is cumbersome, inefficient, awkward, and inconvenient. The problem becomes aggravated when the home user owns numerous video tapes. It is even more serious in video rental and sales stores, where hundreds of videos are offered for lease, rental, and sale.

In an attempt to alleviate this problem, many users and owners have pasted or taped labels on their video cassette containers or have written the name of their tapes on their video cassette containers (storage cases) in permanent ink, felt pen or marker. Such measures mar and deface the container. They also do not look aesthetically pleasing, are not usually uniform, and have an unprofessional appearance. Furthermore, such permanently marked or labeled containers cannot be readily used to store different video tape cassette or identify newly recorded different videos on existing tapes. They are not usually reusable and interchangeable. Such marred boxes (storage cases) are inefficient, wasteful, ugly, and uneconomical.

In addition, the video cassette container is an ideal medium to advertise the products and/or services of others.

Over the years a variety of video tape cassettes, cassette cases, and other containers have been suggested. Typifying these video tape cassettes and cassette containers are those found in U.S. Pat. Nos. 4,488,644; 4,489,832; 4,555,021; 4,557,380; 4,558,782; and 4,593,814. These prior art video tape cassettes, cassette cases, and other containers have met with varying degrees of success.

It is, therefore, desirable to provide an improved video cassette container assembly which overcomes most, if not all, of the preceding problems.

SUMMARY OF THE INVENTION

An improved video tape cassette assembly provides an attractive and efficient container and display apparatus which is appealing, easy to use, and convenient. Advantageously, the novel video tape cassette assembly is economical, simple to install, and effective.

To this end, the novel video tape cassette assembly has a video tape box, such as a video cassette tape storage case or other container, to store, cover, and protect a video tape cassette. Different size video tape boxes can be use to contain different format video tape cassettes, such as Beta video tape cassettes, VHS video tape cassettes, 8 mm video tape cassettes, ¾ inch commercial video tape cassettes, and European style PAL and SECAM format video tape cassettes.

In order to identify, promote, and/or advertise the movie, program, or other material recorded on the video tape cassette in the box and the products and/or services of others, a plastic, paper, or paperboard web is provided to form a display card or label with descriptive wording, illustrations, pictures, photographs, designs, or other indicia printed on its viewable front surface. One or more connectors are provided to detachably connect and secure the display card or label to the video tape box (storage case). The connectors can comprise a detachable jacket, one or more removable pockets, adhesive tape, glue, thermal bonding, Velcro-type fasteners, felt pads, rivets, zippers, clips, or other fasteners.

Preferably, the video tape cassette assembly has an outer jacket secured to the video tape cassette container (storage case). The jacket can be secured to the exterior surface of the cassette container with double sided adhesive tape, or with internal corner pockets which snugly receive the outer corners of the cassette container, or by heat bonding or molding its periphery to the periphery of the outer surface of the cassette container.

The jacket has at least one inner panel and at least one outer panel. Each of the panels are substantially planar or flat. The inner panel has an inner front surface which is positioned to face the outer panel and has an inner back surface which is positioned to face the exterior surface of the cassette container. The outer panel has an outer front surface which is positioned to face outwardly and has an outer back surface which is positioned to face the inner panel. Preferably, the outer panel has at least one U-shaped connecting portion which is securely engaged and connected to the inner panel, such as by thermal bonding, hermetically sealing, glue, Velcro-type fasteners, rivets, or other fasteners. The U-shaped connecting portion of the outer and inner panels matingly engage and cooperate with each other to provide a pocket for receiving a display card or label.

Desirably, the pocket has a viewable transparent outer panel portion or window, which is bounded by the U-shaped connecting portion, to view the display card or label in the pocket. The pocket may be provided with a closure flap which snaps, buttons, or otherwise detachably fastens to the pocket to close and block the access opening or slot to the pocket, to further secure and enclose the display card or label, if desired.

In the preferred form, the jacket has front, back, and side panels with multiple pockets for enhanced use, flexibility, and convenience.

As used in this patent application, the term "display card" means a card or label with writing, printing, designs, pictures, illustrations, or other indicia printed thereon. The display card can be made of paper, paperboard, or plastic, and the like and can be thin or thick, and can be rigid, semi-rigid, or flexible.

A more detailed explanation of the invention is provided in the following description and appended claims taken in conjunction with the accompanying drawings.

BRIEF DESCRIPTION OF THE DRAWINGS

FIG. 1 is a perspective view of a video tape cassette container assembly in accordance with principles of the present invention;

FIG. 2 is an assembly view of the video tape cassette display jacket;

FIG. 3 is an assembly view of the video tape cassette container assembly;

FIG. 4 is a fragmentary cross-sectional view of the video tape cassette container assembly;

FIG. 5 is a perspective view of the video tape cassette container assembly being assembled and showing in dotted or phantom line a portion of the video tape cassette display jacket preparatory to assembly;

FIG. 6 is a perspective view of another video tape cassette container assembly in accordance with principles of the present invention;

FIG. 7 is a perspective view of the video tape cassette container assembly in a partially opened position and showing in dotted or phantom line display cards or advertising labels being inserted in the video tape cassette display jacket;

FIG. 8 is an assembly view of the video tape cassette container assembly; and

FIG. 9 is a perspective view of another video tape cassette display jacket in accordance with principles of the present invention.

DETAILED DESCRIPTION OF THE PREFERRED EMBODIMENTS

Referring to the Drawings, a video tape cassette-container and display assembly 10 provide an identification, promotional, and advertising display apparatus to safely store, protect, cover, and house a video tape cassette 12 (FIG. 8), as well as to readily identify, promote, and advertise the movie or programs recorded on the video tape cassette. While the video cassette display assemblies in the preferred embodiments, are described in conjunction with a VHS video tape cassette, it is to be understood, that the video cassette display assemblies can be used with other video tape cassettes, such as Beta video tape cassettes, 8 mm video tape cassettes, ¾ commercial video tape cassettes, European style format video tape cassettes, etc.

As shown in FIG. 8, the video tape cassette 12 has a forward drive sprocket or spindle 13 and a rearward driven sprocket or spindle 14. A cassette tape 16 is connected to, extends between, and is wound upon the sprockets.

As shown in FIG. 8, the video tape cassette can be conveniently stored, protected, and housed in a box-like video tape cassette-container and storage case 18. The video tape container is made of colored, black, or clear, substantially rigid impact-resistant plastic, such as ABS (acrylonitrile-butadiene-styrene). Other types of plastic can be used. The video tape container has a front wall 20, a back wall 22, and an intermediate side wall 24. The intermediate side wall provides a binder or spine which extends between the front and back walls. The side wall is integrally hinged and pivotally connected to the front wall along a front vertical score line and crease 26. The side wall is integrally hinged and pivotally connected to the back wall along a back vertical score line and crease 28. The walls are moveable from an open position for receiving and permitting removal of the video tape cassette to a closed storage position for enclosing, covering and protecting said video tape cassette.

Each of the walls of the video tape container are preferably rectangular with rounded corners and are of the same height. The front and back walls are similar in size. The side wall is substantially narrower than the front and back walls. Each of the walls has an inwardly facing internal surface 30, 32, or 34, and a substantially planar or flat, outwardly facing, external surface 36, 38, or 40. The front wall 20 has a substantially rectangular cassette-receiving front portion or flange 42 which extends inwardly from the internal surface 30 of the front wall 20. The back wall 22 has a substantially rectangular cassette-receiving back portion or flange 44 (FIG. 8) which extends inwardly from the internal surface of the back wall 22 and is substantially aligned in registration with said front flange when the container is in the closed position. The cassette-receiving back portion or flange 44 can also be positioned inwardly of the cassette-receiving front portion or flange 42 as in the storage case of FIGS. 1, 3, and 5. The cassette-receiving flanges cooperate with each other to snugly and telescopically receive and matingly engage the video tape cassette. The front and back cassette-receiving flanges each having telescopically engagable, complementary, inner flange portions 45 and 46 (FIG. 8) which snap fit and interlockingly and matingly engage each other when the container is in the closed position.

In order to identify, promote, and advertise the movie or program recorded on the tape cassette enclosed within the cassette container (storage case) and-/or to identify, promote, and advertise any other product or service, the cassette container is equipped with an outer, double ply, flexible, plastic shell 47. The shell provides a viewable jacket, cover, and protective casing for the cassette container. The shell is made of flexible transparent plastic, such as polyethylene, polypropylene, polyvinyl-acetate, or polyvinyl-chloride. Other types of transparent plastics can be used. The shell is preferably clear although it may be of any color so long as the shell is transparent.

The shell jacket, and casing has thin, substantially planar or flat, inner panels 48-50 and thin, substantially planar or flat, outer panels 52-54. The panels are substantially rectangular with rounded corners. The inner panels 48-50 include an inner front panel 48, an inner back panel 49, and an inner intermediate side panel 50. The inner side panel 50 extends between the inner front and back panels. The inner side panel is integrally hinged and connected to the inner front panel along an inner front, vertical score line and crease 56. The inner side panel is integrally hinged and connected to the inner back panel along an inner back, vertical score line and crease 58.

The inner front panel 48 of the outer shell, jacket, and casing is about the same size and shape as the exterior surface of the front wall of cassette container (storage case). The inner front panel 48 has a front wall-engaging surface 60 and an outer front panel-engaging surface 62. The inner back panel 49 is about the same size and shape as the exterior surface of the back wall of the cassette container. The inner back panel has a back wall-engaging surface 64 and an outer back panel-engaging surface 66. The inner side panel 50 is about the same size and shape as the exterior surface of the side wall of the cassette container. The inner side panel has a side wall-engaging surface 68 and an outer side panel-engaging surface 70.

The inner front panel 48 includes front wall connectors or attachment means 72 which extend inwardly from the front wall-engaging surface 60 of the inner front panel 48 for attachment to the front wall 20 of the cassette container. The inner back panel 49 includes back wall connectors and attachment means 73 which extend inwardly from the back wall-engaging surface 64 for attachment to the back wall 22 of the cassette container. The inner side panel 50 includes side wall connectors and attachment means 74 which extend inwardly from the side wall-engaging surface 64 for attachment to the side wall 24 of the cassette container.

In the embodiments of FIGS. 1–5, the connectors and attachment means comprise double sided sticky, adhesive tape strips 76–78 which stick and connect to the inner surfaces of the inner panels and the outer surface of the walls of the cassette container. The tape strips can be positioned vertically and parallel to each other for uniformity.

In the embodiment of FIGS. 6–8, the connectors and attachment means comprise internal corner pockets or strips 80–83 which snugly receive and matingly engage the outer corners of the front and back walls of the cassette container.

In the embodiment of FIG. 9, the connectors and attachment means comprise an inner, rectangular, flexible, peripheral flap or strip 86 which snugly fits over and engages the outer peripheral edges of the cassette container.

The outer panels 52–54 of the outer shell, jacket, and casing are preferably transparent, thin, and flexible. The outer panels include an outer front panel 52, an outer back panel 53, and an outer intermediate side panel 54 extending between the outer front and back panels. The outer side panel 54 is integrally hinged and connected to the outer front panel along an outer front, vertical score line and crease 94. The outer side panel 54 is integrally hinged and connected to the outer back panel along an outer back, vertical score line and crease 96.

The outer front panel of the shell, jacket, and casing is substantially the same size and shape as the inner front panel and is aligned in registration and connected along its periphery by bonding to the inner front panel. The outer back panel is substantially the same size and shape as the inner back panel and is aligned in registration and connected along its periphery by bonding to the inner back panel. The outer side panel is substantially the same size and shape as the inner side panel and is aligned in registration with and connected along its periphery by bonding to the inner side panel.

The outer front panel has an inner front panel-engaging surface 98 and an outwardly facing front surface 100. The outer back panel has an inner back panel-engaging surface 102 and an outwardly facing back surface 104. The outer side panel has an inner side panel-engaging surface 106 (FIG. 6) and an outwardly facing side surface 108.

In the illustrative embodiments of FIGS. 1 and 6, the outer front panel of the shell, jacket, and casing, comprises at least one U-shaped connecting portion 109 which is connected to and cooperates with the inner front panel to provide at least one front pocket 110 to receive a front panel display card or label 112. The outer back panel comprises at least one U-shaped connecting portion 113 which is connected to and cooperates with the inner back panel to provide at least one back pocket 114 to receive a back panel display card or label 116 (FIG. 7). The outer side panel comprises at least one U-shaped connecting portion 117 which is connected to and cooperates with the inner side panel to provide at least one side pocket 118 to receive a side panel display card or label 12 (FIG. 6). The front pocket has an outwardly facing, transparent front flap 122 which provides a front window for viewing the front panel display card. The back pocket has an outwardly facing, transparent back flap 123 which provides a back window for viewing the back panel display card. The side pocket has an outwardly facing, transparent side flap 124 which provides a side window for viewing the side panel display card. Each of the pockets is bounded by a U-shaped connecting portion such as 109, 113, or 117, which is bonded or otherwise connected to the adjacent inner and outer panels.

In FIGS. 1, 3, and 5, the front and back panels have a set or array of four aligned pockets 128 and 130. In FIG. 6, the front panel has one pocket and the back panel has a pair of vertically aligned, horizontal pockets 132 and 134. The front, side, and back pockets of FIG. 1 and the front and side pockets of FIG. 6 are open along their tops to provide upper access openings 136 for vertical insertion and removal of their display cards or labels. The back pockets of FIG. 6 are open along their outer side to provide side access openings 138 for lateral or transverse insertion and removal of their display cards or labels.

In order to assemble the video cassette container-display assembly, the outer shell, jacket and casing is attached to the exterior surface of the video cassette storage case, such as by double sided adhesive tape, or by snugly placing the internal corner-receiving pockets or peripheral flap over the corners or peripheral edges of the video cassette storage case. The video tape cassette can then be placed in the video cassette storage case.

In use, the video cassette storage case is opened and the video tape cassette is snugly placed and seated in the video cassette-receiving portions (flanges) of the storage case. The storage case can then be closed and one or more display cards or labels can can be inserted into the pockets of the outer shell, jacket, and casing. The preceding procedure can be reversed. The display cards or labels can identify, promote, and/or advertise the movie, programs, or other material recorded on the video tape cassette. The display cards or labels can also identify, promote, and/or advertise the merchandise (products) and/or services of one or more businesses, companies, charitable organizations, associations, individuals, and the like. The storage case is opened when the video tape cassette is removed.

If a different movie, program, or other matter is recorded on the video tape cassette or a different video tape cassette is placed in the storage case, or if a different product or service is desired to be advertised or promoted on the video tape cassette container, the prior display cards or labels can be simply removed from the pockets and easily replaced by inserting into the pockets, appropriate new display cards or labels identifying, promoting, and/or advertising the new movie, programs, or other products or services, without damaging, defacing, or otherwise ruining the storage case.

Among the many advantages of the video tape cassette container assemblies are:
1. Facilitates identification, promotion and advertising of tape cassettes stored in cassette containers (storage cases).
2. Facilitates identification, promotion and advertising of various products and services.
3. Aesthetically pleasing.
4. Attractive.

5. Appealing.
6. Uniform.
7. Compact.
8. Economical.
9. Interchangeable.
10. Flexible.
11. Easy to use.
12. Simple to manufacture and assemble.
13. Can be readily installed on existing cassette storage cases or attached to new cassette storage cases.
14. Can be produced in different sizes with various patterns of pockets to accommodate different size cassette containers and different video tape cassette formats.
15. Can be produced in different sizes with various patterns of pockets to accommodate different tastes and individual preferences.
16. Effective.
17. Convenient.

Although embodiments of the invention have been shown and described, it is to be understood that various modifications and substitutions, as well as rearrangements of parts, can be made by those skilled in the art without departing from the novel spirit and scope of this invention.

What is claimed is:

1. A video tape cassette assembly, comprising:
a video tape box for enclosing a video tape cassette selected from the group consisting of a Beta video tape cassette, a VHS video tape cassette, an 8 mm video tape cassette, a ¾ inch video tape cassette, and a European style video tape cassette, said video tape box having an exterior front surface, side surface, and back surface;
a web of material selected from the group consisting of plastic, paper, and paperboard, said web comprising a display label having a viewable front surface with indicia printed thereon;
a protective casing for covering substantial portions of at least one of said surfaces of said video tape box, said protective casing having connecting means for connecting said protective casing to at least one of said surfaces of said video tape box and having a substantially transparent flexible multi-window portion with an array of separate windows for containing, covering, and permitting viewing of said display label.

2. A video tape cassette assembly in accordance with claim 1 wherein said protective casing has a front panel with at least one front window for containing, covering and permitting viewing of said display label, a side panel with a side window for containing, covering and permitting viewing of said display label, and a back panel with at least one back window for containing, covering and permitting viewing of said display label, and at least one of said panels comprises a plurality of said separate windows.

3. A video tape cassette assembly in accordance with claim 2 wherein at least one of said panels has a set of four substantially similar windows arranged in a symmetrical aligned pattern.

4. A video tape cassette assembly in accordance with claim 1 wherein said video tape box has corners and said connecting means includes substantially triangular pockets for snugly receiving the corners of said video tape box.

5. A video tape cassette assembly, comprising:
a video tape cassette storage case having an outer cover comprising an exterior front surface, an exterior side surface, and an exterior back surface;
a multi-ply flexible plastic display jacket covering and secured to said outer cover of said video tape cassette storage case;
said multi-ply flexible plastic display jacket having at least one inner panel positioned against and operatively connected to the outer cover of said video tape cassette storage case and at least one outer panel positioned upon and attached to said inner panel and facing outwardly away from said inner panel and said outer cover of said video tape cassette storage case;
said inner panel of said multi-ply display jacket being substantially planar and having an inner front surface for facing said outer panel and an inner back surface for facing said video tape cassette storage case;
said outer panel of said multi-ply display jacket being substantially planar and having an outer front surface for facing outwardly and an outer back surface for facing said inner panel; and
said outer panel having at least one generally U-shaped connecting portion securely engaged and cooperating with said inner panel to provide a display card-receiving pocket therewith, and said pocket having a viewable transparent outer panel-portion bounded by said U-shaped connecting portion for viewing a display card in said pocket.

6. A video tape cassette assembly in accordance with claim 5 wherein said inner panel includes substantially triangular, inwardly extending corner pockets for snugly receiving the corners of the video tape cassette storage case.

7. A video tape cassette assembly in accordance with claim 5 wherein said multi-ply jacket has at least one front pocket, a side pocket, and at least one back pocket.

8. A video tape cassette assembly, comprising:
a video tape cassette selected from the group consisting of a Beta video tape cassette, a VHS video tape cassette, an 8 mm video tape cassette, a ¾ inch video tape cassette, and a European style video tape cassette, said video tape cassette having a drive sprocket and a driven sprocket and a cassette tape connected to and between and at least partially wound upon said sprockets;
a video tape container for storing said video tape cassette, said video tape container having an outer cover comprising a front wall, a back wall, and an intermediate side wall extending between and hingeably connected to said front and back walls, each of said walls being substantially rectangular and being substantially the same height, said front and back walls being substantially similar in size, said intermediate side wall being substantially smaller than said front and back walls, each of said walls having an inwardly facing internal surface and a substantially planar, outwardly facing, external surface, said walls comprising substantially rigid impact-resistant plastic and being moveable from an open position for receiving and permitting removal of said video tape cassette to a closed storage position for enclosing and protecting said video tape cassette, said front wall having a substantially rectangular cassette-receiving front flange extending inwardly from the internal surface of said front wall, said back wall having a substantially rectangular cassette-receiving back flange extending inwardly from the internal surface of said back wall and aligned in registration with said front flange when said container is in said closed position, said cassette-receiving flanges cooperating with each other to snugly and telescopically receive said video tape cassette and said front and back cassette-receiving flanges each having inner flange portions for snap fitting interlocking engagement with each other when said container is in said closed position;

a multi-window double ply, transparent flexible, plastic shell providing a viewable jacket and protective casing for said video tape container, said multi-window double ply transparent shell having substantially planar inner panels and substantially planar outer panels, said panels comprising flexible substantially transparent plastic members selected from the group consisting of polyethylene, polypropylene, polyvinyl-acetate, and polyvinylchloride, said panels being substantially rectangular, said inner panels including an inner front panel, an inner back panel, and an inner intermediate side panel extending between and hingeably connected to said inner front and back panels, said inner front panel being at least about the size of said front wall of said container and having a front wall-engaging surface and an outer front panel-engaging surface, said inner back panel being at least about the size of said back wall of said container and having a back wall-engaging surface and an outer back panel-engaging surface, and said inner side panel being at least about the size of said side wall of said container and having a side wall-engaging surface and an outer side panel-engaging surface, said inner front panel including front wall attachment means extending inwardly from said front wall-engaging surface for attachment to said front wall of said outer cover of said video tape container, said inner back panel including back wall attachment means extending inwardly from said back wall-engaging surface for attachment to said back wall of said outer cover of said video tape container, said outer panels being substantially transparent and including an outer front panel, an outer back panel, and an outer intermediate side panel extending between and hingeably connected to said outer front and back panels, said outer front panel being about the same size as and aligned in registration with said inner front panel, said outer back panel being about the same size as and aligned in registration with said inner back panel, said outer side panel being about the same size as and aligned in registration with said inner side panel, said outer front panel having an inner front panel-engaging surface and an outwardly facing front surface, said outer back panel having an inner back panel-engaging surface and an outwardly facing back surface, said outer side panel having an inner side panel-engaging surface and an outwardly facing side surface, said outer front panel being connected to and cooperating with said inner front panel to provide at least one front pocket for receiving a front panel display card, said outer back panel being connected to and cooperating with said inner back panel to provide at least one back pocket for receiving a back panel display card, said outer side panel being connected to and cooperating with said inner side panel to provide at least one side pocket for receiving a side panel display card, said front pocket having an outwardly facing, transparent front flap defining a front window for viewing said front panel display card, said back pocket having an outwardly facing, transparent back flap defining a back window for viewing said back panel display card, and said side pocket having an outwardly facing, transparent side flap defining a side window for viewing said side panel display card.

9. A video tape cassette assembly in accordance with claim 8 wherein said front and back walls of said outer cover of said video tape container have outer corners, said front wall attachment means comprises substantially triangular front corner-receiving portions for snugly receiving the outer corners of said front wall of said outer cover of said video tape container, and said back wall attachment means comprises substantially triangular back corner-receiving portions for snugly receiving the outer corners of said back wall of said outer cover of said video tape container.

10. A video tape cassette assembly in accordance with claim 8 wherein at least one of said pockets defines a side access opening for lateral insertion and removal of a display card.

11. A video tape cassette assembly in accordance with claim 8 wherein said front and back panels of said multi-window double ply jacket each comprise a set of four substantially similar aligned windows and pockets arranged in a substantially symmetrical pattern.

* * * * *